June 7, 1949.　　　　　L. R. LYONS　　　　　2,472,219
SYNTHESIS OF HYDROCARBONS
Filed Feb. 13, 1945
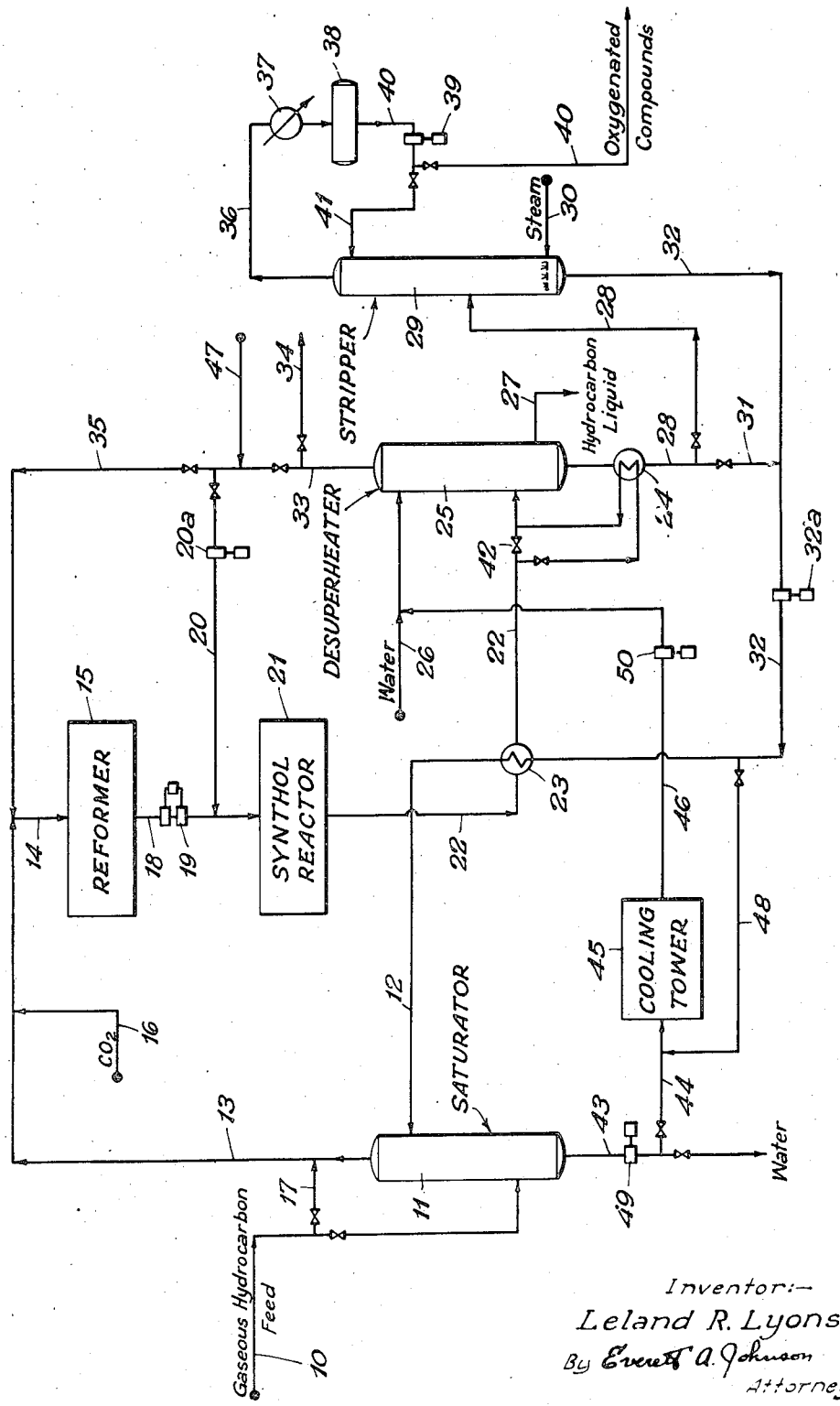
Inventor:—
Leland R. Lyons
By Everett A. Johnson
Attorney Patented June 7, 1949

2,472,219

UNITED STATES PATENT OFFICE 2,472,219

SYNTHESIS OF HYDROCARBONS

Leland R. Lyons, Hammond, Ind., assignor to Standard Oil Company, Chicago, Ill., a corporation of Indiana Application February 13, 1945, Serial No. 577,679

9 Claims. (Cl. 260—449.6)

This invention relates to the production of useful liquid hydrocarbons and oxygenated hydrocarbon compounds from gases and it pertains more particularly to an improved combination of producing hydrogen and carbon monoxide mixtures and of synthesizing hydrocarbons and oxygenated compounds therefrom under pressure in the presence of a catalyst of the iron type.

In the conversion of hydrogen and carbon monoxide with an iron catalyst to produce hydrocarbons having more than one carbon atom to the molecule, substantial amounts of oxygenated compounds are produced, and it is an object of this invention to effect recovery and/or utilization of substantial proportions of the oxygenated compounds. It is a further object of this invention to provide method and means for employing the water resulting from the conversion of hydrogen and carbon monoxide into hydrocarbons as part of the feed to the reaction in which the hydrogen and carbon monoxide mixture is produced. Another object is to provide a system wherein water recovered from the reaction products and from which the oxygenated compounds have been removed is used for the direct contact cooling of reaction products from the hydrocarbon synthesis step. An additional object is to provide method and means whereby the hydrocarbon employed as part of the feed to the gas-making step aids the cooling of the water used in the direct contact cooling of the hydrocarbon synthesis reaction products. Still another object is to provide method and means for effecting optimum utilization of the carbon within the system. These and additional objects will become apparent in view of the disclosure hereinafter.

The objects of this invention are attained by reforming hydrocarbon gas to produce a synthesis gas mixture of hydrogen and carbon monoxide suitable for use in the synthesis of hydrocarbons. The mixture is produced by reacting the hydrocarbon, water and carbon dioxide. A preferred catalyst is a group VIII metal or metal oxide which may be supported on a carrier such as Super Filtrol, silica gel, clay, alumina, or the like. Nickel on alumina is particularly useful. A temperature of between about 1400 and 1800° F. or higher for example about 1600° F. may be used.

The hydrogen-carbon monoxide mixture is withdrawn from the reformer, compressed to about 300 pounds gauge, and contacted with an iron-type catalyst within a synthesis reactor. The synthesis gas may be contacted with a catalyst of the iron type at a temperature within the approximate range of 450 and 650° F., under a pressure within the approximate range of between about 50 and about 500 pounds per square inch, and at a space velocity within the approximate range of between about 100 and 2500 or more volumes of gas per hour per volume of catalyst in the synthesis reactor. The gas volumes are measured at 60° F. and under atmospheric pressure, and the volume of the catalyst in the synthesis reactor is measured with the catalyst at rest.

The products from the synthesis reaction are cooled in a direct contact desuperheater for effectively removing a portion of the hydrocarbon liquids from reaction gases and for accumulating a substantial portion of the water-soluble oxygenated compounds produced in the reaction. The condensible hydrocarbon gases may be separated from unreacted gases and carbon dioxide in a suitable hydrocarbon adsorber-stripper system. The gases predominating in carbon dioxide and light hydrocarbons may be recycled to the make gas preparation step or to the synthol reactor. The liquid hydrocarbon products may be fractionated, as is well known in the art.

It has been found that a substantial proportion of the synthesis product when employing the iron-type synthesis catalyst comprises oxygenated compounds. These oxygenated compounds appear in the hydrocarbon liquids, in the water condensed from the reaction stream, and in gas streams beyond the liquid recovery. A substantial proportion of the recoverable oxygenated compounds is found in the condensed water, the water layer comprising between about 2 and 20 per cent or more of oxygenated compounds. These compounds have been identified as including among others: formaldehyde, acetaldehyde, acetone, methyl ethyl ketone, and methyl, ethyl, n-propyl and n-butyl alcohols.

The water produced in the synthesis reaction and that employed in direct contacting of the reaction products is withdrawn from the desuperheater, raised to boiling temperature and the chosen pressure, and introduced into a steam stripper. A rich fraction comprising substantially greater proportions of oxygenated compounds is taken overhead from the stripper, cooled, and recovered. The stripped or lean water is withdrawn from the bottom of the stripper, increased in temperature, and introduced into a methane saturator. The fresh feed with or without carbon dioxide is passed through the packed saturator, and about equal weights of methane and water vapor are withdrawn overhead from the saturator and introduced into the reformer or make-gas step along with substantial amounts of carbon dioxide.

The invention will be more clearly understood from the following detailed description of a specific example read in conjunction with the accompanying diagrammatic flow sheet which forms a part of this specification and which represents a schematic flow diagram of my improved system.

A methane-containing hydrocarbon gas such as natural gas may be introduced into the system through line 10 into saturator 11, water being introduced into saturator 11 by line 12. I prefer to employ natural gas (which may consist chiefly of methane) as the raw material, although it should be understood that many features of my invention are also applicable to gases derived from coal, shale, or other carbonaceous materials or from petroleum refining processes. The hydrocarbon gas along with water vapor is transferred by lines 13 and 14 to the gas preparation unit or reformer 15. If desired to vary the hydrocarbon, water, and $CO_2$ ratio, a portion of the fresh feed can by-pass the saturator 11 via line 17. Carbon dioxide may be introduced into this unit through line 16, the proportions of these gases being regulated to give the desired hydrogen-to-carbon monoxide ratio. The hydrogen-carbon monoxide mixture is withdrawn from the gas preparation unit 15 by line 18.

The hydrogen-carbon monoxide mixture in the approximate ratio of between 1:1 and 3:1 is passed by line 18 to compressor 19 which introduces this synthesis gas, together with recycle gas from line 20 when desired, into the synthol reactor 21. Reactor 21 may operate under a pressure within the approximate range of between about 50 and about 500 pounds or more per square inch for example at about 300 pounds gauge and at a temperature within the approximate range of between about 450 and 650° F., for example about 610° F. The reactor may be of the fixed, moving bed or fluid type and, in any case, should be provided with means for abstracting the heat of synthesis to maintain the synthesis temperature within a relatively narrow range. The reactor of the so-called fluid type i. e. one designed to maintain finely divided catalyst in dense suspended turbulent or liquid-like phase, is particularly useful.

In general, the catalyst for the conversion step is preferably one or more group VIII metal or metal oxide preferably nickel or iron or mixtures thereof with each other or with copper. The catalyst may be promoted by other metals or metal compounds such as those of aluminum, magnesium, manganese, calcium, uranium, chromium, molybdenum, vanadium, and the like. The catalyst may be supported on a suitable carrier such as clay, silica gel, alumina, Super Filtrol, etc.

An active iron-type catalyst can be prepared by a number of methods well known in the art and may, for example, be of the precipitated type supported upon Super Filtrol or other carrier. Alternatively, an iron catalyst of the type used for ammonia synthesis can be employed, such catalyst ordinarily being prepared by oxidizing iron in a stream of oxygen, fusing the oxide, and crushing. Various promoters may be added. Another method employs the decomposition of iron carbonyl to form an iron powder which may be pelleted and sintered. Catalyst particles without support may have a bulk density as high as about 120 to 150 pounds per cubic foot, whereas the bulk density of iron catalyst precipitated on Super Filtrol or other carrier may be as low as about 10 pounds per cubic foot.

Instead of employing a single reactor 21, I may employ a number of reactors in parallel or in series. When a single reactor is employed or a plurality of reactors operating in parallel, I prefer to recycle a large amount of the effluent gases from the reactor, recycle ratios as large as 100:1 having been found to give excellent results. When the recycle is in the upper part of this range, the space velocity with respect to fresh feed will, of necessity, be in the lower range for a given installation.

To illustrate my process further, a representative operation producing about 3000 barrels per day of gasoline will be described with reference to the drawings. In producing this amount of gasoline and in converting about 12% of the carbon to oxygenated compounds, 100,500 pounds of methane, 175,000 pounds of carbon dioxide, and 100,000 pounds of water per hour may be charged to the gas preparation unit 15 to produce a hydrogen-carbon monoxide mixture. This mixture when charged to the hydrocarbon synthesis reactor 21 produces about 8,500 pounds hydrogen, 16,000 pounds methane, 163,000 pounds of carbon dioxide, 100,000 pounds of water, and 88,000 pounds heavier hydrocarbons and oxygenated compounds per hour.

The gases and vapors leaving the synthesis reactor 21 pass by line 22 through heat exchangers 23 and 24 and into the desuperheater-scrubber 25 which may be operated at substantially conversion pressure. About 983,000 pounds of water are introduced into the desuperheater 25 via line 26 at a temperature of about 100° F. The reactor effluent at about 250° F. is introduced at a low point in the desuperheater 25. Although desuperheater 25 is illustrated as including a water-hydrocarbon separation zone at the bottom, it should be understood that a mixture of hydrocarbon liquid and water may be drawn off from the desuperheater 25 to a settling drum from which hydrocarbon liquid can be drawn off as a top layer and the water layer can be withdrawn from the bottom of the settling drum by line 28. The gaseous fraction withdrawn from desuperheater 25 by line 33 can be recycled to the reformer 15 via lines 35 and 14 or to synthol reactor 21 by line 20 and blower or compressor 20a. If desired, the gaseous product fraction can be withdrawn by line 34 and processed for recovery of carbon dioxide which may be returned to the system by line 47. The gaseous fraction in 33 contains about 163,000 pounds of carbon dioxide per hour and 175,000 pounds per hour are required in the reformer. About 26,000 pounds of liquid hydrocarbon per hour is withdrawn by line 27 at a temperature of about 150° F. to a fractionator not shown.

The water phase includes about 1,080,000 pounds of water and about 27,000 pounds of oxygenated hydrocarbon compounds per hour. This water phase is withdrawn from the bottom of desuperheater 25 via line 28 at a temperature of about 150° F. and is increased in temperature by passing through heat exchanger 24 or other means and is introduced into stripper 29 at about 212° F. If desired, the stripper can be operated at a higher temperature and pressure. A total of about 1,100,000 pounds per hour of water is introduced into the stripper including about 21,400 pounds of steam supplied via line 30 near the base of the stripper 29. Part of the water may be diverted by valved line 31 and recycled to saturator 11 by lines 32 and 12. The overhead from stripper 29 comprises about 26,000 pounds of oxygenated hydrocarbon compounds and about 3600 pounds of water to give about 30,000 pounds of an 88 weight per cent oxygenated hydrocarbon compound solution. The overhead is passed by line 36 through cooler 37 and into collection drum 38 which may be operated at about atmospheric pressure and a temperature of about 120° F. The condensate may be withdrawn from the system by line 40 and pump 39. If desired, a portion of the liquid can be returned as reflux to the stripper 29 by valved line 41.

The oxygenated hydrocarbon compounds withdrawn by line 40 normally will include predominantly the materials which are high boiling, the formaldehyde, acetaldehyde and other lower boiling compounds being recovered separately or being recycled to the reformer in the unreacted gas stream. The stream of oxygenated hydrocarbon compounds and water in line 40 can be treated by any method to recover the separate components if desired. Maximum boiling mixtures with water may be formed and can be recovered as such.

The bottoms from stripper 29 comprise about 1,100,000 pounds per hour and are withdrawn via line 32 at about 212° F. The water may be increased in temperature by passing through synthesis product heat exchanger 23 where the temperature is increased for example to about 280° F. This water can then be introduced via line 12 into the saturator 11 where it is contacted with methane introduced via line 10 at a temperature of about 100° F. The gas withdrawn at about 20 pounds gauge and at a temperature of about 225° F. comprises about equal weights of methane and water. The liquid water effluent from the saturator is withdrawn via pump 49 and line 43 at about 185° F. and may contain small proportions of oxygenated compounds. The content of the water will be determined by the ratio of the amount of water that is recycled by line 44 to the amount rejected from the system. This water which comprises about 1,000,000 pounds per hour may be cooled to about 100° F. in a cooling tower 45 and supplied by lines 46 and 26 as the cooling water to desuperheater 25. If desired, a portion of the water in line 32 can be diverted by valved line 48 and returned to the desuperheater 25.

From the above description, it will be apparent that my invention contemplates various recycle features for the maximum utilization of carbon values and for recovery of oxygenated by-products of hydrocarbon synthesis. I have provided method and means for converting gaseous hydrocarbons into hydrocarbons of higher molecular weight and for the recovery of useful oxygenated compounds. Likewise, novel method and means have been provided for combining the reforming of hydrocarbons, the recovery of products from a hydrocarbon synthesis, and the concentration of a water solution of oxygenated compounds. While steam stripping has been described as a means of recovery of the oxygenated compounds present in the aqueous phase from the desuperheater, it is to be understood that other means may be used, such as extraction using a suitable solvent or conversion of the alcohols present to the more volatile aldehydes and ketones and subsequent recovery of all aldehydes and ketones present by stripping or by the addition of sodium bisulfite to precipitate the compound formed with regeneration of the aldehydes and ketones by the addition of acid.

It is to be understood that, although my invention has been described with reference to illustrative examples, the invention is not limited thereto. Modifications may be made therein by those skilled in the art without departing from the spirit of the invention defined by the appended claims.

What I claim is:

1. In a process for converting hydrocarbon gases into hydrocarbons of higher molecular weight, the steps which comprise converting a hydrocarbon gas into a mixture of gases comprising hydrogen and carbon monoxide, contacting said mixture of gases with a synthesis catalyst to produce higher-molecular-weight hydrocarbons and oxygenated compounds, partially condensing the vaporous reaction product, withdrawing oxygenated hydrocarbon compounds from said reaction product, and recycling at least a portion of said oxygenated hydrocarbon compounds to said hydrocarbon gas for reconversion to hydrogen and carbon monoxide.

2. In a process for converting hydrocarbon gases into hydrocarbons of higher molecular weight, the steps which comprise converting a hydrocarbon gas into a mixture of gases comprising hydrogen and carbon monoxide, contacting said mixture of gases with a synthesis catalyst to produce higher-molecular-weight hydrocarbons and oxygenated compounds, partially condensing the vaporous reaction product, permitting the condensate to stratify, separating therefrom a liquid hydrocarbon phase and an aqueous liquid phase rich in oxygenated compounds, and recycling at least a portion of said rich aqueous liquid phase in combination with said hydrocarbon gas for conversion to hydrogen and carbon monoxide.

3. In a process for converting hydrocarbon gases into hydrocarbons of higher molecular weight, the steps which comprise converting a hydrocarbon gas into a mixture of gases comprising hydrogen and carbon monoxide, contacting said mixture of gases with a synthesis catalyst to produce higher-molecular-weight hydrocarbons and oxygenated compounds, partially condensing the vaporous reaction product, permitting the condensate to stratify, separating therefrom a liquid hydrocarbon phase and an aqueous liquid phase rich in oxygenated hydrocarbon compounds, separating oxygenated hydrocarbon compounds from said aqueous liquid phase, and recycling at least a portion of said organic oxygenated compounds to said hydrocarbon gas for reconversion to hydrogen and carbon monoxide.

4. In a process for converting hydrocarbon gases into hydrocarbons of higher molecular weight, the steps which comprise converting a hydrocarbon gas into a mixture of gases comprising hydrogen and carbon monoxide, contacting said mixture of gases with a synthesis catalyst to produce higher-molecular-weight hydrocarbons and oxygenated compounds, partially condensing the vaporous reaction product, withdrawing a gas phase rich in oxygenated hydrocarbon compounds from said partially condensed reaction product, and recycling at least a portion of said gas phase to said hydrocarbon gas for reconversion to hydrogen and carbon monoxide.

5. In a process for converting hydrocarbon gases into hydrocarbons of higher molecular weight, the steps which comprise converting a hydrocarbon gas into a mixture of gases comprising hydrogen and carbon monoxide, contacting said mixture of gases with a synthesis catalyst to produce higher-molecular-weight hydrocarbons and oxygenated compounds, quenching the vaporous reaction product with relatively cool water, permitting the condensate to stratify, separating therefrom a liquid hydrocarbon phase and an aqueous liquid phase rich in oxygenated compounds, separating oxygenated compounds from said aqueous liquid phase, recycling at least a portion of the resulting lean aqueous liquid phase to said quenching operation, and recycling at least a portion of said oxygenated compounds to said hydrocarbon gas for reconversion to hydrogen and carbon monoxide.

6. In a process for converting hydrocarbon gases into hydrocarbons of higher molecular weight, the steps which comprise reacting a hydrocarbon gas with water to produce hydrogen and carbon monoxide, contacting the hydrogen and carbon monoxide mixture with a synthesis catalyst to produce higher-molecular-weight hydrocarbons and oxygenated compounds, quenching the vaporous reaction product with relatively cool water, permitting the condensate to stratify, separating therefrom a liquid hydrocarbon phase and an aqueous liquid phase rich in oxygenated compounds, separating oxygenated compounds from said aqueous liquid phase and recycling at least a portion of the resulting lean aqueous liquid phase with said hydrocarbon gas for conversion to hydrogen and carbon monoxide.

7. In a process for converting hydrocarbon gases into hydrocarbons of higher molecular weight, the steps which comprise saturating a gaseous hydrocarbon with water at an elevated temperature, commingling carbon dioxide therewith, reacting the mixture of gases to produce a hydrogen and carbon monoxide mixture, contacting the hydrogen and carbon monoxide mixture with an iron catalyst to produce higher-molecular-weight hydrocarbons and oxygenated compounds, quenching the vaporous reaction product with relatively cool water, permitting the condensate to stratify, and separating therefrom a liquid hydrocarbon phase and an aqueous liquid phase rich in oxygenated compounds, separating a portion of said oxygenated compounds from said aqueous phase, and recycling portions of the resulting lean aqueous phase to said hydrocarbon-saturation step and to said quenching step.

8. The process of claim 7 wherein a portion of said rich aqueous liquid phase is recycled to said hydrocarbon-saturation step.

9. In a process for converting methane into hydrocarbons of higher molecular weight, the steps which comprise contacting and humidifying a methane-containing gas with water at a temperature sufficiently high to produce a vaporous mixture containing at least about 50% water by weight, commingling carbon dioxide therewith, reacting the vaporous mixture at a temperature between about 1400 and 1800° F. to produce a mixture of hydrogen and carbon monoxide having a molar ratio between about 1:1 and 3:1, contacting said mixture with an iron catalyst at a temperature between about 450 and 650° F. to produce oxygenated compounds and hydrocarbons having more than one carbon atom in the molecule, quenching the vaporous reaction product with relatively cool water, permitting the condensate to stratify, and separating therefrom a liquid hydrocarbon phase and an aqueous liquid phase rich in oxygenated compounds, stripping a portion of said oxygenated compounds from said aqueous liquid phase, withdrawing a lean aqueous liquid phase containing a diminished proportion of oxygenated compounds, cooling a portion of said lean aqueous phase and recycling it to said quenching step, and further heating another portion of said lean aqueous phase and recycling it to said humidifying step.

LELAND R. LYONS.

REFERENCES CITED

The following references are of record in the file of this patent:

UNITED STATES PATENTS

| Number | Name | Date |
| --- | --- | --- |
| 1,201,850 | Mittasch | Oct. 17, 1916 |
| 2,164,403 | Guthrie et al. | July 4, 1939 |
| 2,183,146 | Michael | Dec. 12, 1939 |
| 2,224,049 | Herbert | Dec. 3, 1940 |
| 2,234,941 | Keith | Mar. 11, 1941 |
| 2,248,099 | Linckh | July 8, 1941 |
| 2,347,682 | Gunness | May 2, 1944 |